(12) United States Patent
Schnabel et al.

(10) Patent No.: US 12,250,320 B2
(45) Date of Patent: Mar. 11, 2025

(54) METHOD RELATING TO A MOTOR VEHICLE DRIVER ASSISTANCE SYSTEM

(71) Applicant: MAGNA ELECTRONICS SWEDEN AB, Vargarda (SE)

(72) Inventors: Jochen Schnabel, Vargarda (SE); Olaf Schwartz, Vargarda (SE); Jonas Villasmil, Vargarda (SE)

(73) Assignee: Magna Electronics Sweden AB, Vårgårda (SE)

( * ) Notice: Subject to any disclaimer, the term of this patent is extended or adjusted under 35 U.S.C. 154(b) by 1208 days.

(21) Appl. No.: 16/639,179

(22) PCT Filed: Aug. 13, 2018

(86) PCT No.: PCT/EP2018/071948
§ 371 (c)(1),
(2) Date: Feb. 14, 2020

(87) PCT Pub. No.: WO2019/034621
PCT Pub. Date: Feb. 21, 2019

(65) Prior Publication Data
US 2020/0235936 A1 Jul. 23, 2020

(30) Foreign Application Priority Data

Aug. 16, 2017 (EP) .................... 17186406

(51) Int. Cl.
*H04L 29/06* (2006.01)
*B60W 50/00* (2006.01)
(Continued)

(52) U.S. Cl.
CPC .......... *H04L 9/3239* (2013.01); *B60W 50/00* (2013.01); *B60W 60/001* (2020.02); *G06F 8/61* (2013.01);
(Continued)

(58) Field of Classification Search
CPC ......... H04L 9/3239; H04L 67/12; H04L 9/50; H04L 2209/84; H04L 67/104;
(Continued)

(56) References Cited

U.S. PATENT DOCUMENTS 9,650,337 B2 5/2017 Boiteau et al.
10,366,204 B2 7/2019 Tanner, Jr. et al.
(Continued)

FOREIGN PATENT DOCUMENTS

CN 110796855 A 2/2020
CN 112543928 A 3/2021
(Continued)

OTHER PUBLICATIONS

International Search Report and Written Opinion of PCT/EP2018/071948 mailed Sep. 3, 2018.

*Primary Examiner* — Joseph P Hirl
*Assistant Examiner* — Leynna Truvan
(74) *Attorney, Agent, or Firm* — DICKINSON WRIGHT PLLC

(57) ABSTRACT

A method of securing operating instructions for a driver assistance system of a motor vehicle. The method including: a) implementing a distributed blockchain including a plurality of blocks, a copy of the blockchain being stored on each of a plurality of nodes. Wherein, each block includes a different version of the operating instructions, b) performing a verification routine including checking that the copies of the blockchain are identical. And, where a fault copy of the blockchain is not identical, flagging the fault copy as insecure. And preventing use of the fault copy, thus preventing installation of the operating instructions comprised in the blocks of the fault copy.

11 Claims, 9 Drawing Sheets

(51) Int. Cl.
*B60W 60/00* (2020.01)
*G06F 8/61* (2018.01)
*G06F 21/64* (2013.01)
*H04L 9/32* (2006.01)
*H04L 67/12* (2022.01)
*H04L 9/00* (2022.01)

(52) U.S. Cl.
CPC .............. *G06F 21/64* (2013.01); *H04L 67/12* (2013.01); *B60W 2050/0075* (2013.01); *B60W 2050/0095* (2013.01); *B60W 2556/45* (2020.02); *B60W 2756/10* (2020.02); *H04L 9/50* (2022.05); *H04L 2209/84* (2013.01)

(58) Field of Classification Search
CPC ... H04L 67/1095; H04L 67/34; H04L 9/0637; B60W 50/00; B60W 60/001; B60W 2050/0075; B60W 2050/0095; B60W 2556/45; B60W 2756/10; G06F 8/61; G06F 21/64; G06F 21/57; G06F 8/65; G06F 11/0703; G06F 2207/7271; G05B 2219/35428; G05B 2219/35567; G05B 2219/36042; G05B 2219/36082; G05B 2219/36525; G05B 2219/1179; G05B 2219/31302; G05B 2219/31356; G05B 2219/35073; G10K 2210/3017; G11B 2210/3017; G11B 7/013; G11B 2020/1222; G11B 2020/1896; G11B 20/00688; G11B 20/00768; G01R 31/3275; G06T 2201/0064; G11C 2207/2236; H04N 19/137; H04N 1/32625; H04M 3/085; H04Q 3/0075
See application file for complete search history.

(56) References Cited

U.S. PATENT DOCUMENTS

| | | |
|---|---|---|
| 10,447,480 B2 | 10/2019 | Alas et al. |
| 10,579,779 B2 | 3/2020 | Wright et al. |
| 11,050,849 B1 | 6/2021 | Floyd et al. |
| 11,088,842 B1 | 8/2021 | Floyd et al. |
| 11,126,975 B2 | 9/2021 | Haldenby et al. |
| 11,159,308 B2 | 10/2021 | Schwartz et al. |
| 2005/0190619 A1 | 9/2005 | Wakiyama |
| 2012/0284794 A1 | 11/2012 | Trent et al. |
| 2015/0376126 A1 | 12/2015 | Boiteau et al. |
| 2016/0266801 A1* | 9/2016 | Marcelín Jemenez ..................... G06F 3/0622 |
| 2017/0031676 A1 | 2/2017 | Cecchetti et al. |
| 2017/0032676 A1 | 2/2017 | Mesmakhosroshahi et al. |
| 2017/0039330 A1 | 2/2017 | Tanner, Jr. et al. |
| 2017/0046652 A1 | 2/2017 | Haldenby et al. |
| 2017/0097794 A1* | 4/2017 | Jung ....................... G06F 3/064 |
| 2017/0124254 A1* | 5/2017 | van Rooyen ....... H01L 27/0207 |
| 2018/0068091 A1* | 3/2018 | Gaidar .................... G06F 21/10 |
| 2018/0088928 A1* | 3/2018 | Smith .................... H04L 67/34 |
| 2018/0189312 A1 | 7/2018 | Alas et al. |
| 2019/0163883 A1 | 5/2019 | Savanah et al. |
| 2019/0303543 A1 | 10/2019 | Savanah et al. |
| 2019/0340362 A1 | 11/2019 | Wright et al. |
| 2020/0257775 A1 | 8/2020 | Wright et al. |
| 2020/0304288 A1 | 9/2020 | Schwartz et al. |
| 2020/0311272 A1 | 10/2020 | Mondello et al. |
| 2021/0091956 A1 | 3/2021 | Mullett |

FOREIGN PATENT DOCUMENTS

| | | |
|---|---|---|
| KR | 102172534 A | 11/2020 |
| KR | 102172535 A | 11/2020 |

\* cited by examiner

METHOD RELATING TO A MOTOR VEHICLE DRIVER ASSISTANCE SYSTEM

CROSS-REFERENCE TO RELATED APPLICATIONS

This application is a 35 U.S.C. § 371 national phase of PCT International Application No. PCT/EP2018/071948, filed Aug. 13, 2018, which claims the benefit of priority under 35 U.S.C. § 119 to European Patent Application No. 17186406.9, filed Aug. 16, 2017, the contents of which are incorporated herein by reference in their entirety.

FIELD OF THE INVENTION

The present invention relates to method of securing the operation of a driver assistance system, and more particularly relates to a method of securing the operating instructions of a driver assistance system, and traceability thereof, from changes.

BACKGROUND

In order that accidents are avoided and driving laws are complied with, driving a vehicle requires concentration from the driver, often for prolonged periods. Lapses in concentration from the driver lead to increased risk of accidents and/or non-compliance with the law. Increasingly, driver assistance systems that are capable of performing an assistance function are fitted to the driver's vehicle (hereinafter referred to as the "ego vehicle"). For example, the assistance function may comprise relieving the driver of some of his/her driving duties, or may comprise monitoring the driver's performance in order that errors may be anticipated and/or avoided.

Alternatively, the assistance function may introduce some additional functionality not ordinarily available to a driver. Such additional functionality may allow the driver to have more information than they ordinarily would do, in order that they can perform a driving task more easily or safely. A rear-facing camera for example, which can provide a video feed to a driver when reversing, constitutes an example of such an additional functionality. In this example, the video feed allows the driver to reverse-park more easily and safely but is not actually necessarily monitoring the driver's performance or directly performing a task on the driver's behalf.

Driver assistance systems therefore mitigate risk for the driver of the ego vehicle, his/her passengers, and other road users. Ultimately, driver assistance functions will be developed to such an extent that they can control most or all aspects of driving an ego vehicle. In this case, the driver assistance system will be an autonomous driving system.

Driver assistance systems may include active devices, which are capable of actively intervening in the operation of the ego vehicle, for example by changing the speed of the ego vehicle. Driver assistance systems may alternatively, or additionally, include passive devices, which, for example, notify the driver of a particular driving situation so that the user can react to the notification. For example, the driver assistance system may make an audible signal when the ego vehicle deviates across a road marking unexpectedly. A given ego vehicle may include both passive and active systems.

In general, a driver assistance system may include at least one sensor. A particular sensor measures parameters that describe the ego vehicle and/or its surroundings. The data from multiple sensors may be combined. The data from such a sensor or sensors is processed in order to draw conclusions based on the sensor measurements. The driver assistance system may trigger an interaction with the ego vehicle, or with the driver, based on the result of the conclusions. In the case of an autonomous driving system, substantially all driving functions are controlled by the system.

Examples of potential sensors used in driver assistance systems and autonomous driving systems include RADAR systems, LIDAR systems, cameras or camera, inter-vehicle communications (or vehicle-to-vehicle communications), and vehicle-to-infrastructure communications.

A driver assistance system may be used to control a variety of different aspects of driving safety or driver monitoring. For example, ACC ("Adaptive Cruise Control") may use a RADAR or LIDAR system to monitor the distance between the ego vehicle and the vehicle immediately ahead on the road. Such a sensor is able to determine the distance to the vehicle ahead. The driver assistance system also knows, and can control, the velocity of the ego vehicle. The driver assistance system may control the speed of the ego vehicle in order to maintain a predefined safety condition relative to the vehicle ahead. For example, the driver assistance system may control the speed to maintain a certain distance between the ego vehicle and the vehicle ahead. Alternatively, the driver assistance system may control the speed to maintain a predetermined time-period between the vehicle ahead passing a point, and the ego vehicle passing the same point.

There are existing driving assistance systems that monitor the surroundings of the ego vehicle to identify the position of other vehicles and entities on or around the road on which the ego vehicle is travelling. By monitoring the surroundings, such a driver assistance system can maintain a situational awareness for the ego vehicle. This situational awareness can be used to notify the user of potential hazards. For example, the ego vehicle changing lanes when a second vehicle is in a blind spot, or detecting a second vehicle cutting-in to the path of the ego vehicle, may be notified to a driver. The situational awareness may also be used as an input to an ACC system, for example.

In general, the operation of the driver assistance system is dictated by at least one set of operating instructions, which form part of the driver assistance system. The operating instructions may include, for example, machine code, software, compiled executables, libraries, firmware, and other examples the skilled person will appreciate.

The operating instructions of a particular driver assistance system can be updated. Updates may include applying patches, adding functionality, and simply installing the operating instructions for the first time. Updating the operating instructions may correspond to "flashing" the operating instruction onto the driver assistance system (or a part of it). It is important that updates to the operating instructions of a driver assistance system are traceable in a secure and reliable manner. In the remainder of this document, the operating instructions are generally described as being those that dictate the operation of an ECU. However, it will be understood that the operating instructions could dictate the operation of other elements of a driver assistance system, for example, a sensor.

It will be appreciated that an autonomous driving system may correspond generally to a more comprehensive driver assistance system. Thus, whilst the following discussion focusses on driver assistance systems, the intention is that the present invention is also readily applicable to an autonomous driving system.

Because a driver assistance system may perform a variety of safety-critical functionalities (safety of both the driver of the vehicle and others), it is important that any unauthorised interference with the driver assistance system and its operation is detected, and if necessary, acted upon.

Because the operation of the driver assistance system is dictated by the operating instructions, an important element of the security of the driver assistance system and its safe and reliable operation is achieved by securing the operating instructions.

In general, a driver assistance system includes an electronic control unit (ECU). The ECU is effectively a computing device that can perform tasks according to operating instructions it can be thought of as the "brain of the driver assistance system". The operating instructions are generally stored on the ECU, and may comprise both software and firmware. The software may be compiled machine code, may be source code, or may be code that is compiled Just In Time (JIT). A key feature is that the operating instructions dictate the operation of the ECU and therefore at least part of the driver assistance system. A single ego vehicle may have multiple ECUs installed therein. Correspondingly, a single driver assistance system may use multiple sets of operating instructions.

The operating instructions may be updated, for example to increase or change the functionality of the ECU. Updates may take place "over the air", for example via a wireless connection to a network, and ultimately from a source of the update. The update is sent wirelessly to the driver assistance system, whereupon the operating instructions are updated. The updates may alternatively be performed across a physical connection to the driver assistance system. Physical connection updates may be performed when the ego vehicle is being serviced, for example.

In any case, it is important that an update to the operating instructions for a driver assistance system is verified as coming from a trusted source, and that the operating instructions have not been tampered with, compromised, or changed accidentally. If the operating instructions are not verified, then there is potential for undesirable changes to the operating instructions having been made. Such undesirable changes to the operating instructions may be malicious or accidental. Regardless of the cause, such changes to the operating instructions could result incorrect, unreliable, or failed operation of the driver assistance system, which may present a serious safety risk.

In the case of malicious changes to the operating instructions, the malicious party may change the operating instructions so that it appears to the driver that the driver assistance system is working properly, when in fact it is not and the operation of the driver assistance system is unsafe or uncontrolled. Thus, it is particularly important to guard against malicious attacks on driver assistance systems.

In summary, it is important that changes to the operating instructions can only made by an authorised party.

The above discussion focuses on updates to the operating instructions, but it is also important to verify an initial installation of the operating instructions. Such an initial installation may occur at the time of manufacture of the driver assistance system.

It is an object of the invention to provide a method of securing the operation of the driver assistance system, which seeks to address some or all of these issues.

According to a first aspect, there is provided a method of securing operating instructions for a driver assistance system of a motor vehicle, the method including:

a) implementing a distributed blockchain including a plurality of blocks, a copy of the blockchain being stored on each of a plurality of nodes; wherein each block includes a different version of the operating instructions, b) performing a verification routine including checking that the copies of the blockchain are identical; and, where a fault copy of the blockchain is not identical, flagging the fault copy as insecure; and preventing use of the fault copy, thus preventing installation of the operating instructions comprised in the blocks of the fault copy.

Preferably, the method further including a version-add routine including adding a new block to the copy of the blockchain on each node, the new block including an updated version of the operating instructions.

Conveniently, the driver assistance system includes a safety electronic control unit ("ECU"), and wherein the operating instructions dictate the operation of the safety ECU.

Advantageously, the method further including an ECU update routine including installing on the driver assistance system an install version of the operating instructions from an install block, wherein the install block is not comprised in the fault copy.

Preferably, the method further including copying the whole of the install block to the ECU.

Conveniently, each block includes a verified hash value calculated for input data including the respective version of the operating instructions.

Advantageously, the method further including copying the verified hash value of the install version of the operating instructions into a verified hash storage means on the safety ECU.

Preferably, the verified hash value is calculated for input data including at least a portion of install block metadata of the install block.

Conveniently, the blockchain is access-controlled.

Advantageously, the blockchain is encrypted.

According to a second aspect, there is provided a method of tracing operating instructions for a driver assistance system for a motor vehicle, the method including:

a) implementing a distributed blockchain including a plurality of blocks, a copy of the blockchain being stored on each of a plurality of nodes; wherein each block includes at least one install record, wherein each install record includes at least a driver assistance system unique identifier and an operating instructions identifier, b) performing a verification routine including checking that each block of the blockchain is identical across the copies of the blockchain; and, where a fault copy of the blockchain is not identical, flagging the fault copy as insecure; and preventing use of the fault copy, thereby preventing use of the install records comprised in the blocks of the fault copy.

Preferably, the operating instructions identifier includes a version identifier of the installed operating instructions.

Conveniently, the driver assistance system includes a safety electronic control unit ("ECU"), and the installed operating instructions dictate the operation of the safety ECU.

Advantageously, the method further including c) permitting a copy of the blockchain that is not the fault copy to be queried to identify whether a more recent version of the installed operating instructions is available in the copy of the blockchain, and if a more recent version is available, installing the more recent version of the operating instructions on to the driver assistance system.

Preferably, at least one install record includes at least one of: an install time at which the operating instructions corresponding to the operating instructions identifier were installed onto the driver assistance system corresponding to the driver assistance system unique identifier; test results of an operation of the driver assistance system corresponding to the driver assistance system unique identifier.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
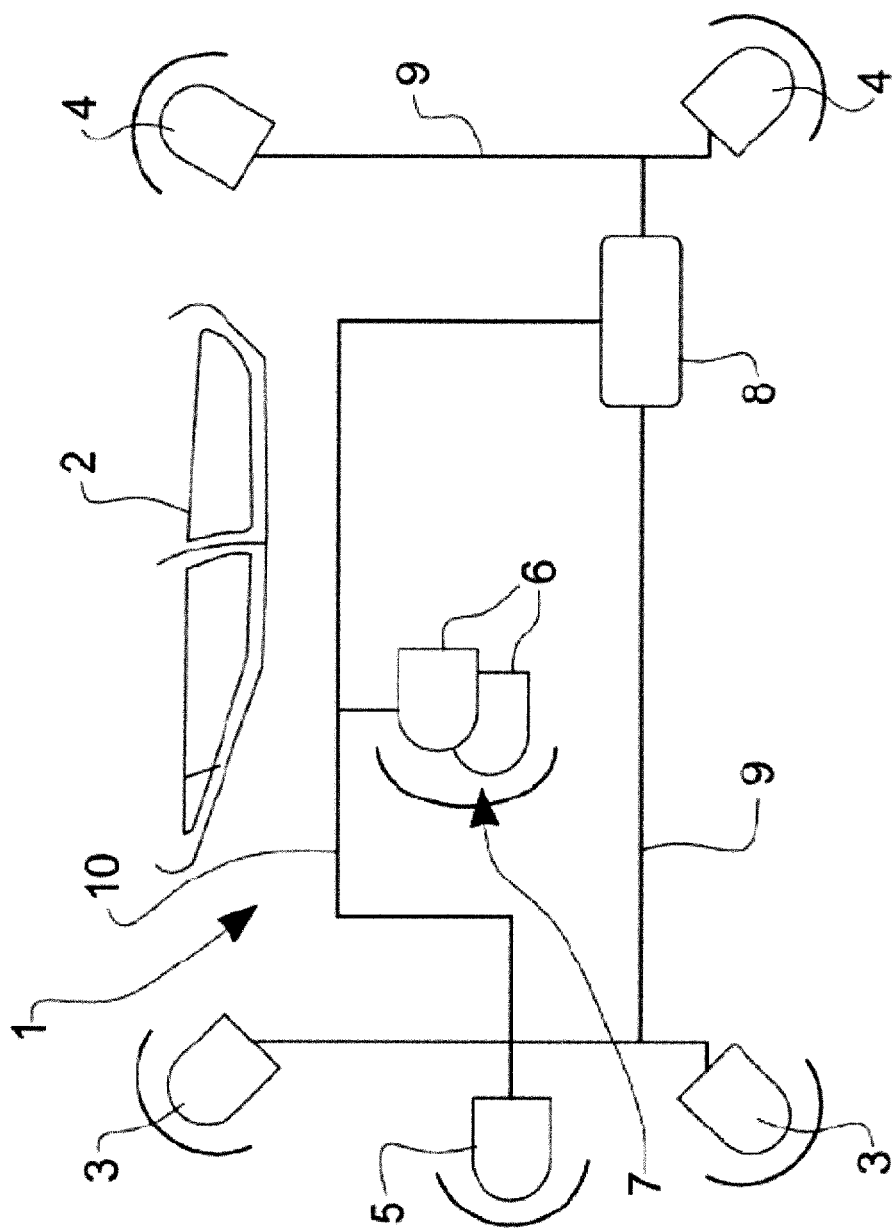
FIG. 1 shows a schematic of an ego vehicle including an example of a driver assistance system.

Turning now to consider FIG. 1 in more detail, there is illustrated a schematic representation of an exemplary driver assistance system 1 installed in an ego vehicle 2 (only one side panel of which is denoted in FIG. 1 to indicate the vehicle's orientation). The driver assistance system 1 comprises a number of different types of sensor mounted at appropriate positions on the ego vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed long-range radar ("LRR") sensor 5 mounted centrally at the front of the vehicle 2, and a pair of generally forwardly directed optical sensors 6 (cameras) forming part of a stereo vision system ("SVS") 7 which may be mounted, for example, in the region of the upper edge of the vehicle's windscreen. The various sensors 3-6 are operatively connected to a central electronic control system which is typically provided in the form of an integrated electronic control unit (ECU) 8 mounted at a convenient location within the vehicle. In the particular arrangement illustrated, the front and rear MRR sensors 3, 4 are connected to the ECU 8 via a conventional Controller Area Network ("CAN") bus 9, and the LRR sensor 5 and the sensors of the SVS 7 are connected to the ECU 8 via a faster FlexRay serial bus 9, also of a type known per se.

Collectively, and under the control of the ECU 8, the various sensors 3-6 can be used to provide a variety of different types of driver assistance functionalities such as, for example: blind spot monitoring; adaptive cruise control; collision prevention assist; lane departure protection; and rear collision mitigation. Similar sensors may be used in an autonomous driving system.

The system may also include at least one secondary ECU. The secondary ECUs may communicate with the ECU 8 via the CAN bus or the FlexRay serial bus 9. The secondary ECUs are discussed in more detail below.

Figure 2:
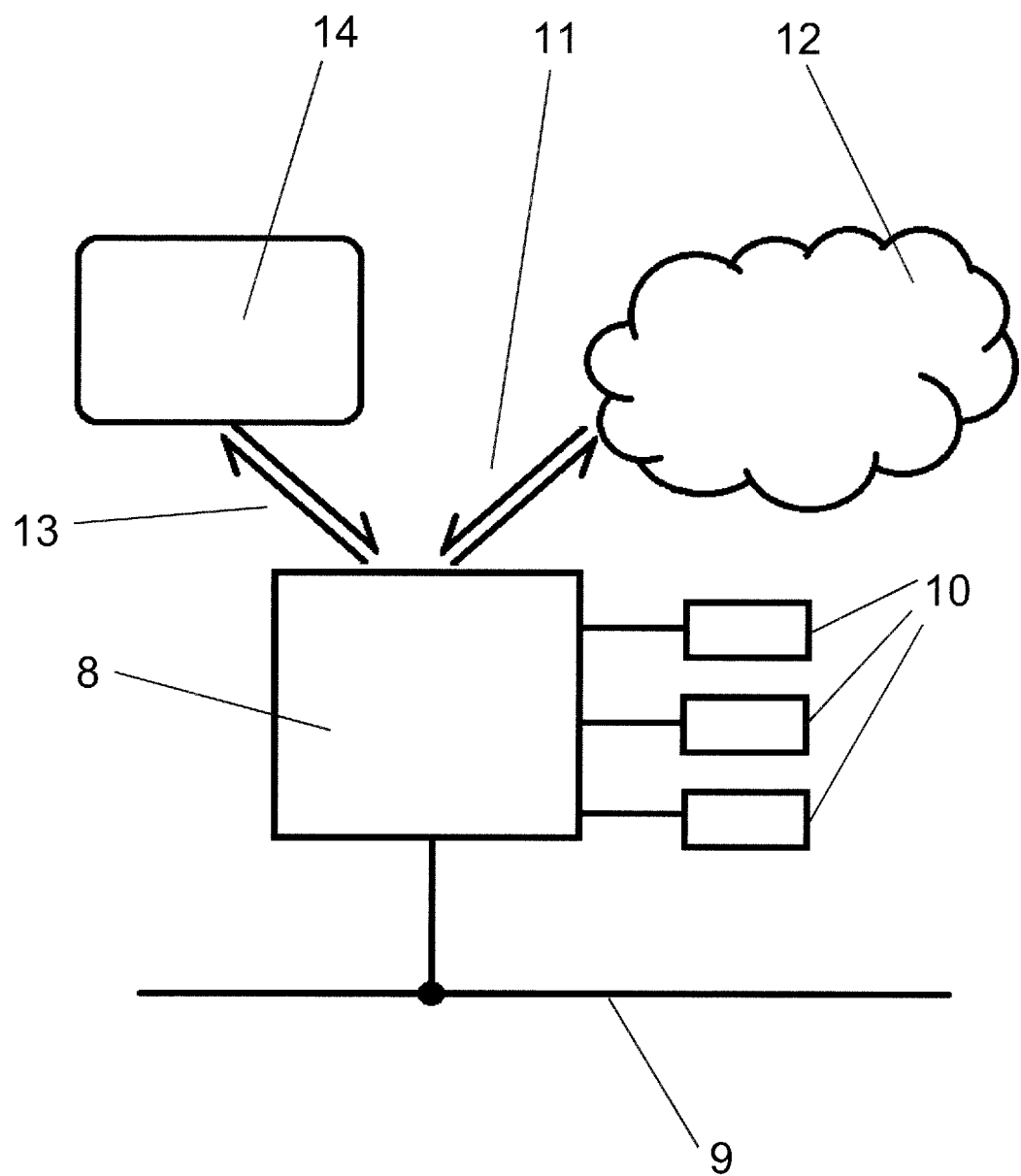
FIG. 2 shows a schematic of a safety electronic control unit (ECU) comprised in a driver assistance system.

An example of the apparatus in accordance with the present invention is shown in FIG. 2. The system includes an electronic control unit (ECU) 8 of the type shown in FIG. 1. The ECU is a so-called safety or primary ECU. The safety ECU 8 is connected to an ego vehicle communication network 9 within the ego vehicle 2. The ego vehicle communication network 9 may be a CAN bus or a FlexRay system, for example. A particular ECU 8 may be connected to more than one such network, which need not be of the same type. The safety ECU 8 may communicate with other ECUs in the ego vehicle via the ego vehicle communication network 9.

The safety ECU 8 is connected to at least one sensor 10. In the example shown in FIG. 2, three sensors 10 are connected to the safety ECU 8, although this number of sensors should not be considered limiting. The connections of each of the sensors 10 to the safety ECU 8 may be wired or wireless. The sensor connections may also be via the ego vehicle communication network 9. The connection between each sensor 10 and the safety ECU 8 may be a two-way connection that is, the safety ECU 8 may receive data from the sensors 10 and the safety ECU 8 may send data and/or commands to the sensors 10. The sensors 10 may be providing information concerning the state of the ego vehicle itself and/or the state of the surrounding environment. The sensors 10 may also provide some data reduction capability [H] that is, determined parameters may be calculated at the sensors 10 and sent to the safety ECU 8 from the sensors 10, rather than (or in addition to) the sensors 10 sending raw measurements performed by the sensors 10 to the safety ECU 8.

The safety ECU 8 is also capable of wireless communication with the internet across a 2-way wireless communication link 11. The internet includes a cloud computing capability 12, to which the safety ECU 8 may offload processing tasks. The wireless communication link 11 may comprise a connection to a mobile telephone communications network, for example. The safety ECU 8 may send processing tasks to the cloud 12 over the wireless communication link 11, where the processing task is performed in the cloud 12, before the results of the processing task are sent back to the safety ECU 8 over the wireless communication link 11.

The wireless communication link 11 may also provide access to data that is not available immediately to the ECU 8. Such data may include map data, for example.

The safety ECU 8 also has a second communication link 13, which provides access to a distributed functionality 14 external to the ego vehicle 2. The distributed functionality may include Vehicle-to-Vehicle communications, and/or Vehicle-to-Infrastructure communications. These may permit driver assistance functionality and/or autonomous driving functionalities in which information can be shared with the ego vehicle 2, and/or to which the ego vehicle 2 can share information across the second communication link 13.

Figure 3:
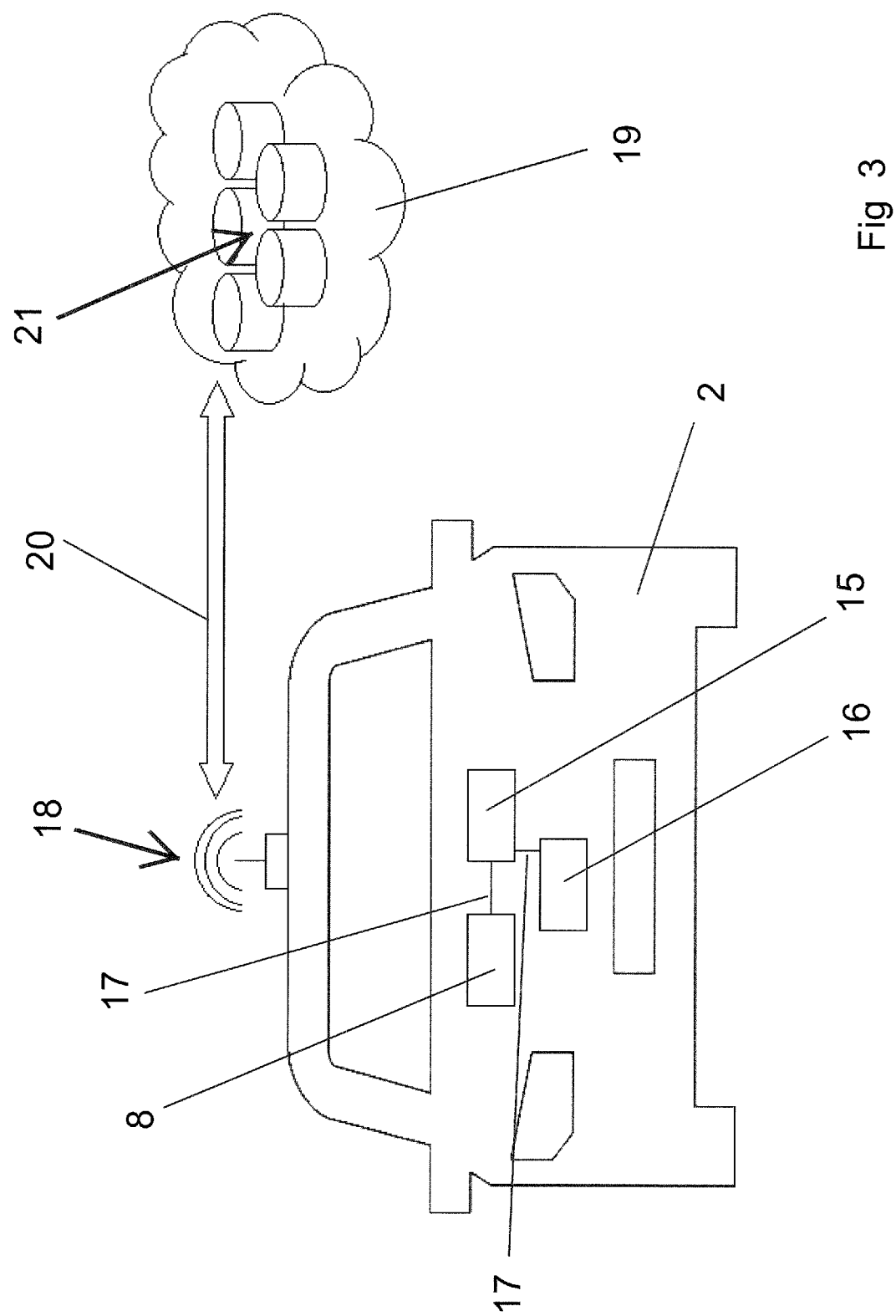
FIG. 3 shows a schematic of an ego vehicle, including the safety ECU of FIG. 2.

FIG. 3 shows a view of the ego vehicle 2. The ego vehicle 2 includes a safety ECU 8. Also included in the ego vehicle 2 are two secondary ECUs 15, 16. The safety ECU 8 and the secondary ECUs 15, 16 are connected via an in-vehicle communication network 17. The in-vehicle communication network 17 may be a CAN bus, a FlexRay bus, a Local Interconnect Network (LIN) or an Ethernet network, for example.

The ego vehicle 2 also includes a wireless communication transceiver 18, which is operatively connected to the ECU 8 (although that connection is not shown in FIG. 3). The wireless communication transceiver 18 is configured for wireless communication with a network 19, via a two-way wireless communication link 20. The network 19 includes storage of operating instructions, and/or operating instruction updates, in at least one storage location 21.

Figure 4:
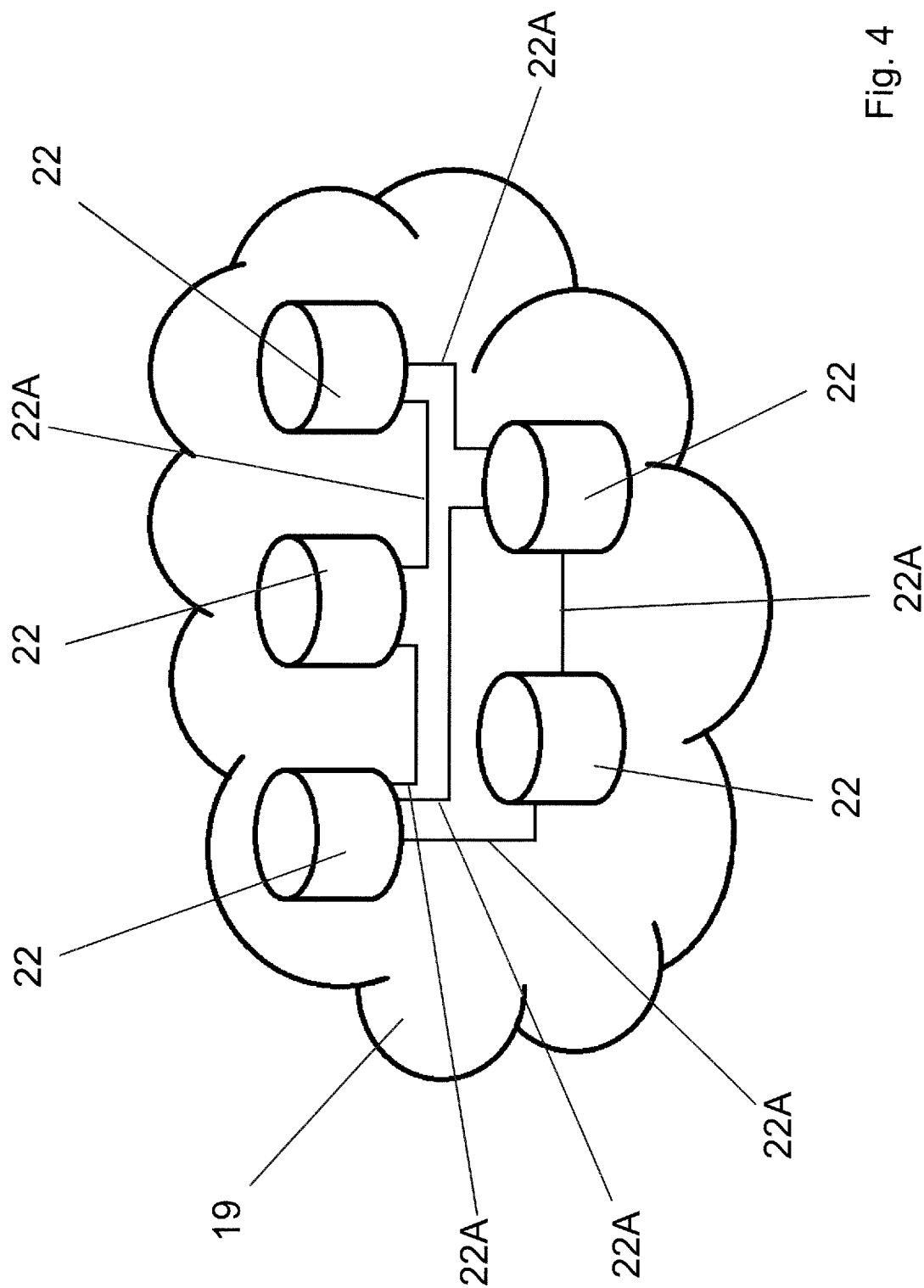
FIG. 4 shows a schematic of a network, with a plurality of nodes, to which the ego vehicle may connect.

FIG. 4 shows a schematic of the network 19. The network 19 includes a decentralised blockchain. The decentralised blockchain includes a plurality of nodes 22. Each node 22 of the decentralised blockchain contains a copy of the blockchain (in the absence of a change to any of the copies). In other words, each of the nodes has a copy of the blockchain; together the nodes form the distributed blockchain. The blockchain may be permissioned. That is, the participants to the blockchain are controlled (i.e. a node with a copy of the blockchain). In other words, a potential node requires permission to participate in the distributed blockchain.

The nodes 22 are interconnected with each other via a plurality of connections 22A. It is not necessary for each node 22 to be directly connected with every other node 22. Equally, the specific connections 22A illustrated FIG. 4 should not to be considered limiting. The nodes 22 may be connected together in the manner of a peer to peer network, for example, which the skilled person will appreciate includes many different possibilities for the individual connections 22A. Individual connections 22A may be made or taken down as a function of time. The connections 22A may be made across a Local Area Network or a Wide Area Network. The connections 22A may be made across the internet.

In any case, the physical servers on which the nodes 22 are formed may be located physically remotely from each other. That is in different, disparate, physical locations. The different locations may be many miles apart and/or in different countries. This makes obtaining simultaneous physical access to more than one node (or access to all of the nodes) very difficult for a would-be attacker. The nodes 22 may be located within different facilities operated and controlled by a single party. For example, nodes 22 may located in separate production and development facilities. Customers of the party provider may have a node located locally to the customer.

Figure 5:
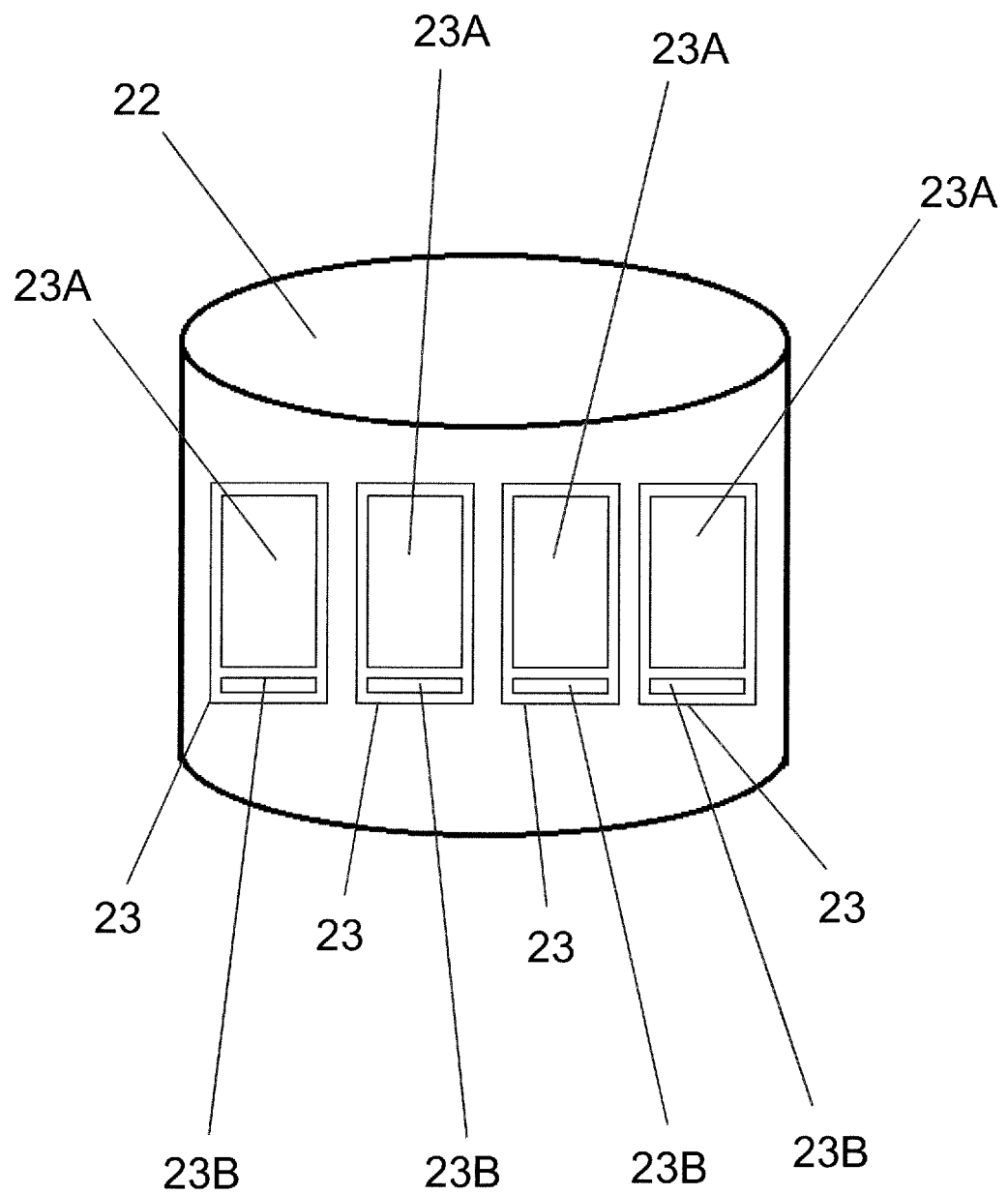
FIG. 5 shows a schematic of one node of the network.

FIG. 5 shows a schematic illustration of a single node 22 of the decentralised blockchain. The node 22 includes a copy of the blockchain, which includes four blocks 23. Together the blocks 23 form a local copy of the blockchain (local to the node 22). Each block 23 includes a data section 23A. Each block also includes block metadata 23B. The block metadata 23B allows the functionality of the blockchain to be achieved. In effect, the blocks 23 are figuratively chained together in a linear sequence. The chain effect relies on hash values formed by hash functions, described briefly below.

In general, a hash function (or hash algorithm) is a computational routine that, given input data, generates a hash value (alternatively known as hash code, digest, or hash) of the input data. A hash function is a mathematical algorithm that maps input data of arbitrary size to a bit string of a fixed size (the hash value). Hash functions per se are known, and will not be described in detail here. Suffice to say, for a first input data the hash function generates a first hash value. If the first input data is changed, even by only a tiny amount, the probability is extremely high that the hash function (when run on the input data again) will generate a second hash value that is different to the first hash value. Thus, by comparing the hash values of a piece of input data generated by the same hash function at two different times, it is possible to determine with an extremely high degree of certainty whether or not the input data has changed, even by a small amount. It is noted that the underlying meaning or contents of the input data is irrelevant for the purposes of a hash function. The hash function operates on the input data at a binary level.

As an example, the hash function may be an SHA-2 algorithm, which is a Secure Hash Algorithm second generation. The particular algorithm used in the described embodiment generates a 256-bit hash value, and is known as SHA-256. However, the present invention should not be limited to SHA-256 or to SHA-2 algorithms. It will be apparent to the skilled person in light of this disclosure that hash functions in general are suitable for use in the present invention.

Returning now to the blockchain of the present invention, the block metadata 23B for a given block 23 includes a block hash value of the preceding block 23 in the blockchain. Any changes made to the data of the previous block 23 will require a change to that block's block hash value, which (if the change is to be undetected) must be recomputed and changed in the following block. In turn, this changes the block hash value of the next block, which must also be recomputed if the change to the data is to be undetected. This gives rise to a daisy chain effect, where the data content of a block depends on the data content of the preceding block.

In general, calculating a single hash value is usually relatively computationally inexpensive. However, allowed values for the block hash value are constrained. Because it is, in general, not possible to predict the change to a hash value when a given change is made to the input data to the hash algorithm, the only way to find a hash value that meets a constraint is by brute force. That is, changing the input data, calculating the hash value, assessing whether hash value meets the constraint, and repeating if it does not.

In order to allow the block hash value to be changed so that the blockchain constraint can be met, the input data to the hash function must be able to be changed when a block is made. To achieve this, a portion of the block metadata 23B called the "nonce" is permitted to be changed. Because the nonce can be changed, the block hash value of that block (as stored in the following block) also changes. The nonce is repeatedly changed, and the block hash value recalculated after each change, until a block hash value that meets the constraint(s) set for the blockchain is achieved. This repeated changing of the nonce and operation of the hash algorithm may require trillions of attempts, for example, before a block hash value that meets the constraints may be expected to be found. The number of tries required before finding a valid block hash value means that determining a block hash value may be computationally expensive, and therefore time consuming to achieve in practice. The computational difficulty of finding a block hash value depends on a number of factors, including the strictness of the constraint(s) for the blockchain.

As well as the block hash value and nonce, other information may also be included in the block metadata 23B.

If a malicious party changes the data content of a block, the block hash values in all subsequent blocks in the chain will not match the data content of the corresponding preceding block and the change can be detected. To make a change to the data and have it remain undetected therefore, the malicious party would have to make the change and then recalculate valid block hash values (i.e. meeting the constraints) for the changed block and all subsequent blocks. With suitably chosen constraints, this may be prohibitively computationally expensive and time consuming. Thus, the data contents of the blockchain are secured, and changes to the blockchain can be detected.

Each local copy of the blockchain data may be verified in a blockchain security check in which the block hash value in the blockchain metadata 23B is checked against a test hash value calculated for the data of the block. If any change (malicious or accidental) is made in the blockchain copy, the occurrence of the change is noted, and the blockchain copy is identified as having been changed. This blockchain security check can occur within a single node, no connections external to the node being necessary. Thus, this process may be referred to as an intra-node mode of security. Each node is configured to perform such a blockchain security check, operating on the blockchain copy. The blockchain security check may be performed periodically by each node. The blockchain security check may be performed whenever a read request is made to the node, for example. The blockchain security check may be performed before a new block is added to the copy of the blockchain.

Figure 6:
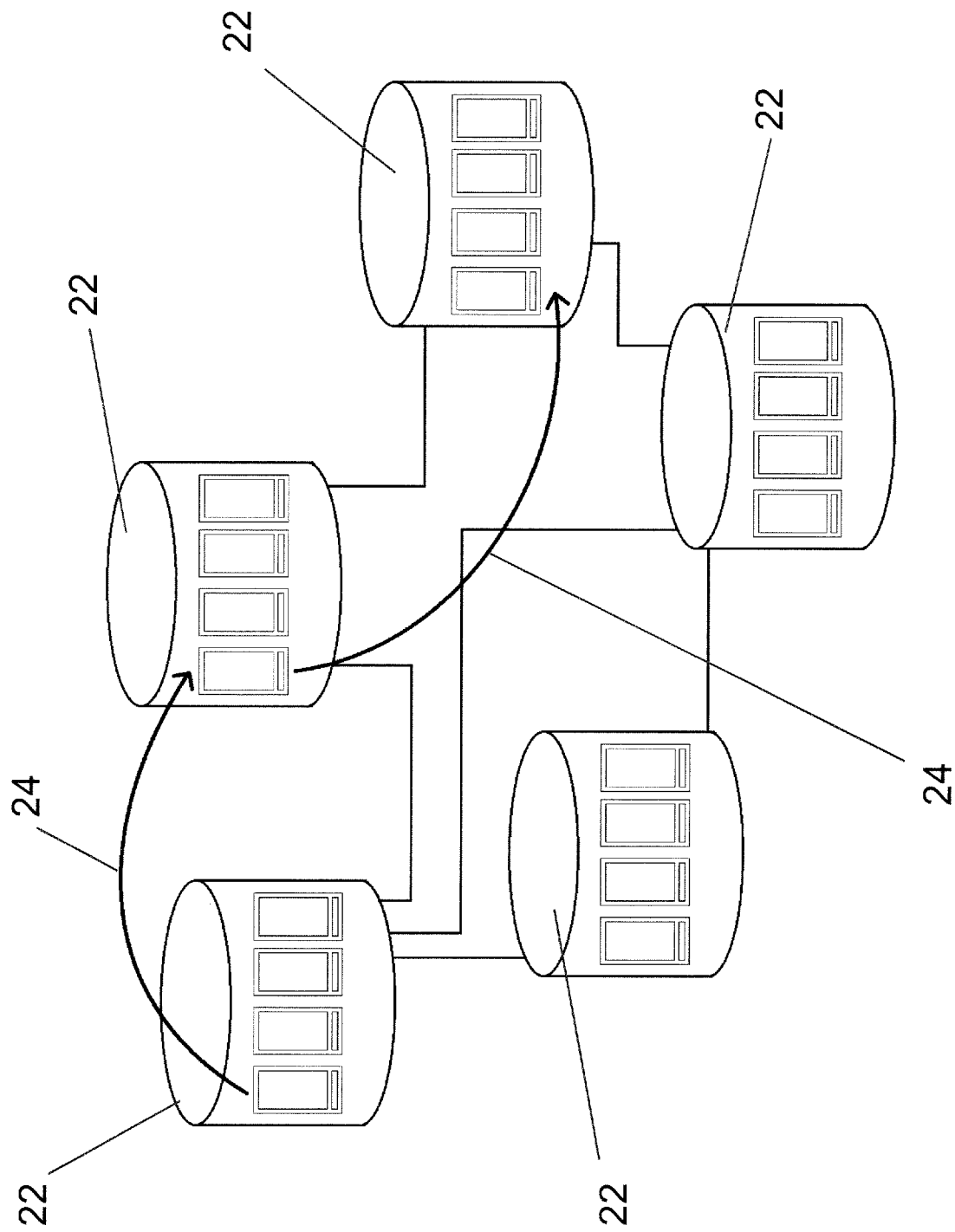
FIG. 6 shows a schematic of a distributed blockchain to which the vehicle may connect.

FIG. 6 is a schematic illustration of the cross checking of the copies of the blockchain data that are distributed across the nodes 22. This forms a verification routine of the distributed blockchain that the copies of the blockchain are identical. The verification routine includes cross checks 24, some of which are illustrated in FIG. 6 by the arrows. Each cross check may include the comparison of blocks. The comparison of all blocks may include comparison of the block hash values of those blocks. If a copy of a blockchain on a compromised node is changed (including modifying the block hash values, as the unauthorised party would have to do in order that the blockchain security check could not note the change; see above), then the copy is flagged as a fault copy. The change to the data of the fault copy may be malicious or accidental. The verification routine allows the discrepancy to be noted between the fault copy of the blockchain and an unchanged copy on at least one of the other nodes.

When a node/blockchain copy is identified as a fault copy, then use of the data within that fault copy is blocked. Using the verification routine it is not possible for a change to be made to the data in a copy of the blockchain without that change being identified. The data in the data sections 23A of the blocks 23 of the blockchain is thus secure from change, which cannot go unnoticed. This verification routine occurs between nodes of the distributed blockchain. Thus, this process is referred to as an inter-node mode of security.

The verification routine may implement a consensus protocol, by which a consensus between nodes is sought. The consensus protocol may fall into a variety of categories, for example:

PoW—Proof of Work;
PoS—Proof of Stake;
PoET—Proof of Elapsed Time;
BFT—Byzantine Fault Tolerance & variants thereof. For example, the Practical Byzantine Fault Tolerance algorithm (PBFT), the SIEVE consensus protocol, or Cross-Fault Tolerance (XFT);
Federated BFT, for example the Ripple Consensus Protocol algorithm or the Stellar Consensus Protocol.

The consensus protocol may be able to tolerate two categories of fault: fail-stop faults and so-called "Byzantine"-type faults. Fail-stop faults are caused by node failures. For example, a node that stops following the consensus protocol is a fail-stop fault. A Byzantine-type fault is a fault caused by a node or nodes behaving erratically. Byzantine-type faults can be caused by a node being compromised. Such a compromised node may provide deliberately false or misleading information to the rest of the distributed blockchain nodes. The consensus protocol is able to reach consensus between the nodes in the presence of fail-stop and/or Byzantine-type faults.

Figure 7:
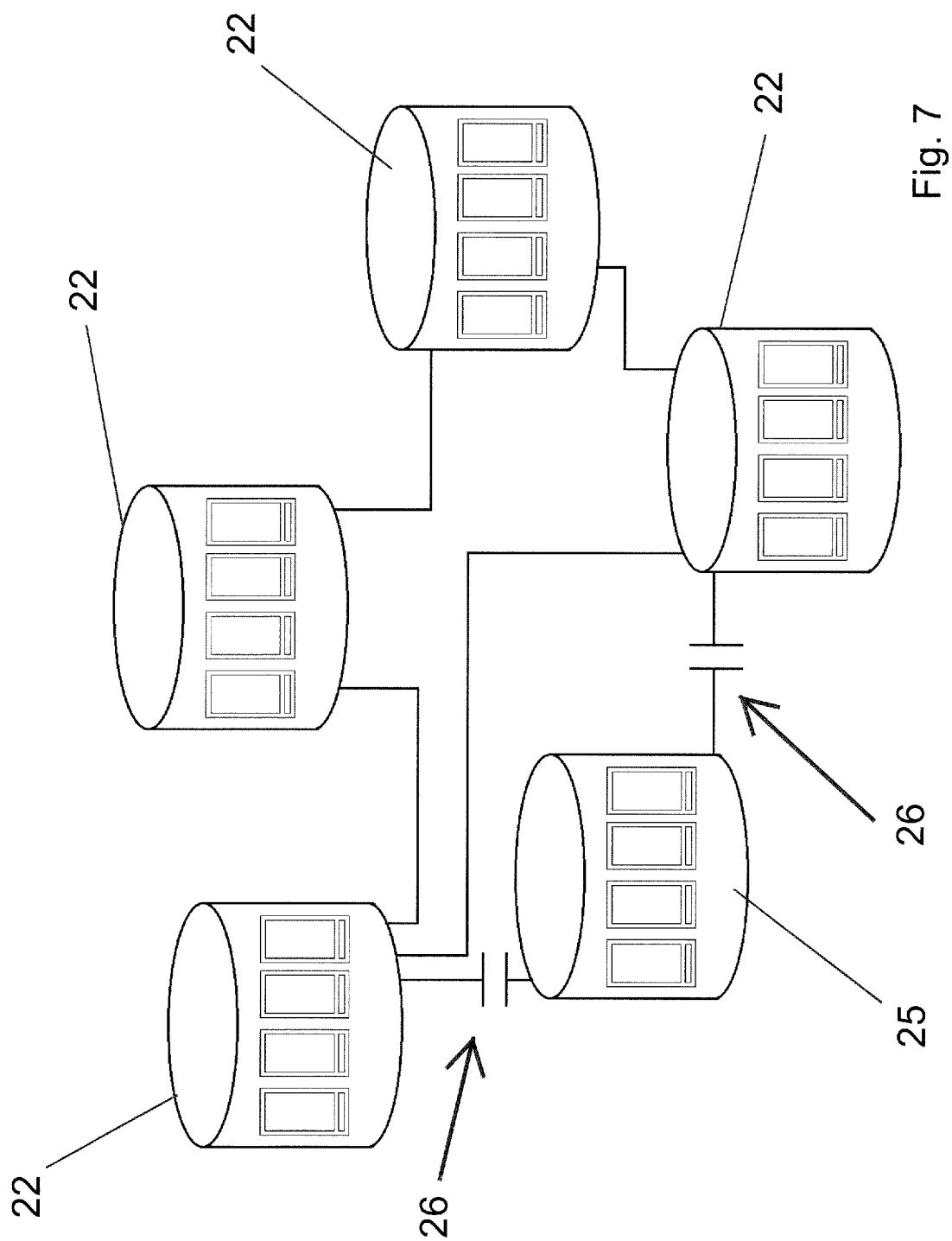
FIG. 7 shows a schematic of a distributed blockchain to which the vehicle may connect with a disconnected node.

FIG. 7 is a schematic illustration of a disconnected node 25, which has become disconnected from the other nodes 22 of the blockchain. The broken network connections 26 that previously interconnected the disconnected node with the other nodes 22 on the network have been broken. This disconnection may be temporary. While the broken network connections 26 remain disconnected, the cross checking of the copies of the blockchain on the disconnected node 25 with the copies of the blockchain that are distributed across the other nodes 22 is not possible. When at least one of the network connections is restored, the verification routine can resume, as above.

Figure 8:
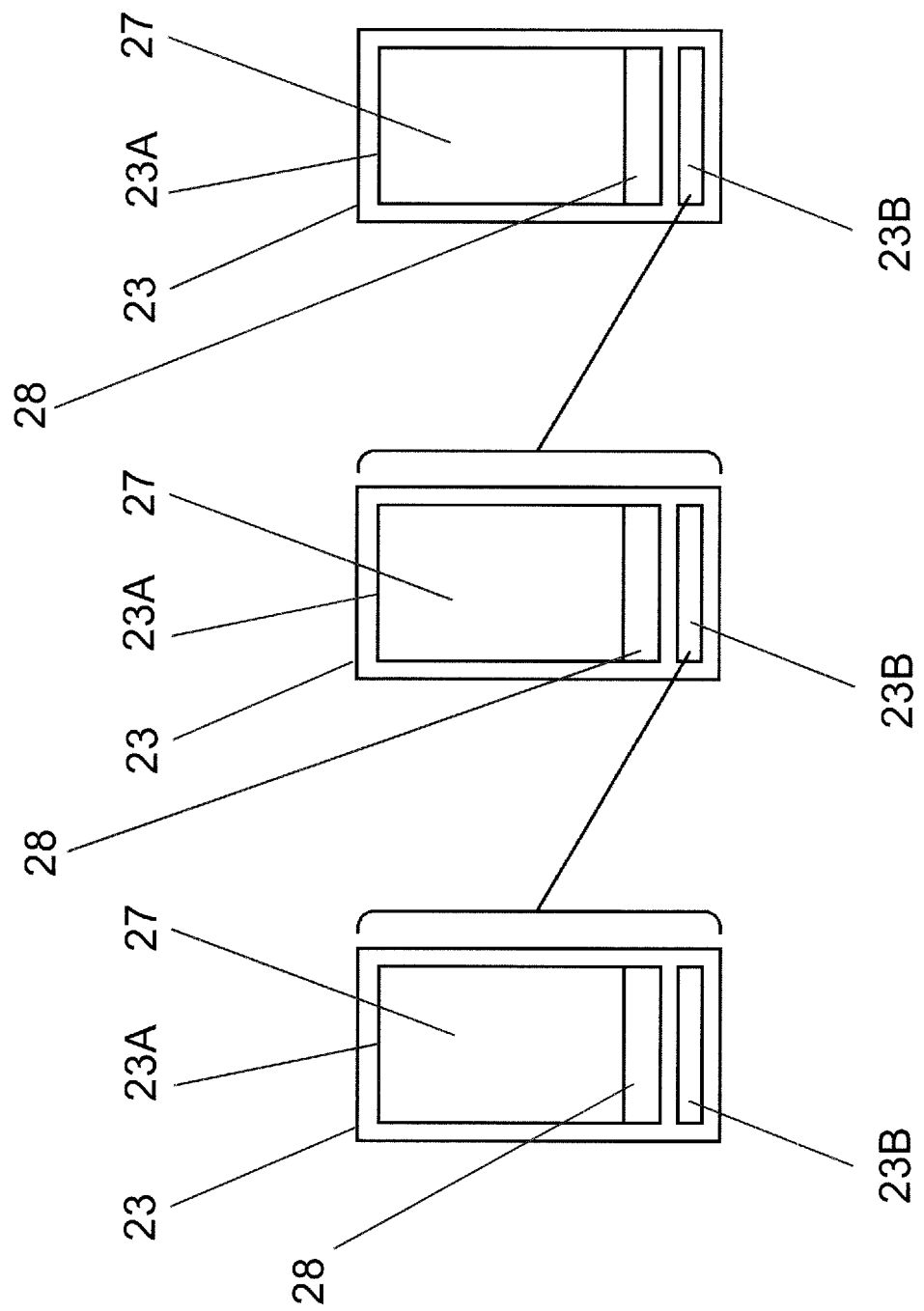
FIG. 8 shows a schematic of a copy of blockchain on a node, in accordance with a first aspect of the present invention.

FIG. 8 illustrates three blocks 23 of a blockchain in accordance with a first embodiment of the invention. In general, each block 23 includes a verified version of the operating instructions and a verified hash value for the verified version of the operating instructions. For example in the embodiment shown in FIG. 8, each data section 23A includes a verified version of the operating instructions 27 for a safety ECU 8 of a driver assistance system. Each data section 23A also includes a verified hash value 28 calculated for the verified, trusted, copy of the operating instructions 27. The verified hash value 28 is the result of performing a hash function on the data corresponding to the verified operating instructions 27 stored in the data section 23A. The verified hash value 28 may be formed by the trusted source of the operating instructions that originally created the corresponding version of the operating instructions 27. If the data corresponding to the operating instructions 27 stored in the data section 23A is changed, then a test hash value calculated for that changed data would not be identical to the verified hash value 28.

Alternatively, the verified hash value 28 for the operating instructions may be contained in the block metadata 23B. The verified hash value may include, or be formed from, at least a portion of the block metadata. For example, the verified hash value for the operating instructions may be equal to the block hash value stored in the corresponding block metadata 23B for the block containing the operating instructions therein.

The distributed blockchain in accordance with the first embodiment implements both the blockchain security check (on intra-node basis) and the verification routine (on an inter-node basis) to secure the operating instructions.

In this way, secure copies of the verified versions of the operating instructions are maintained in the blockchain. The security of the operating instructions is maintained by the internode-cross checking as well as the intrinsic functionality of the blockchain (i.e. using the block hash values). In other words, the distributed blockchain allows for supply of secure copies of the operating instructions to a driver assistance system.

When a verified version of the operating instructions is to be installed on a safety ECU, an ECU update routine is performed. The version of the operating instructions to be installed on the safety ECU is identified; this is the install version. The install version is contained in an install block of the blockchain. A copy of the install version on a node of the distributed blockchain is identified.

It may be checked whether or not the install block is contained in a fault copy of the blockchain. If the install block is not contained in a fault copy, then the install version may be installed from the install block onto the safety ECU.

The verified hash value for the install copy may be calculated for input data including the block metadata of the install block. The verified hash value of the install copy may be calculated for input data including at least a portion of the block metadata of the install block. When the install copy is installed on the safety ECU, the verified hash value may be copied into the safety ECU. For example, the verified hash value may be copied into the into a verified hash storage means on the safety ECU.

Furthermore, additional information from the install block metadata may also be copied to the safety ECU during the ECU update routine. Alternatively, the whole of the install block (including the block metadata and the data section) may be copied into the safety ECU during the ECU update routine. This allows the checking of a hash of the whole of the install block to be compared to the value of that same hash as stored in the block chain. Again, this allows checking of the security of operating instructions during the ECU update routine.

In the first embodiment, when a new or updated version of the operating instructions 27 is produced, a new block 23 is formed and appended to the end of each blockchain copy. The distributed blockchain thereby increases in length by one block. The new block is transmitted to the nodes across the connections 22A, and added to the end of each of the copies of the blockchain. The new block may be formed at one of the nodes 22 before being transmitted to the other nodes 22. The new block can be verified by any node 22 by comparing the block hash value in the blockchain metadata 23B of the putative new block to the node's own calculation of what the block hash value should be according to the data content of the immediately preceding block in that node's copy of the blockchain data.

Figure 9:
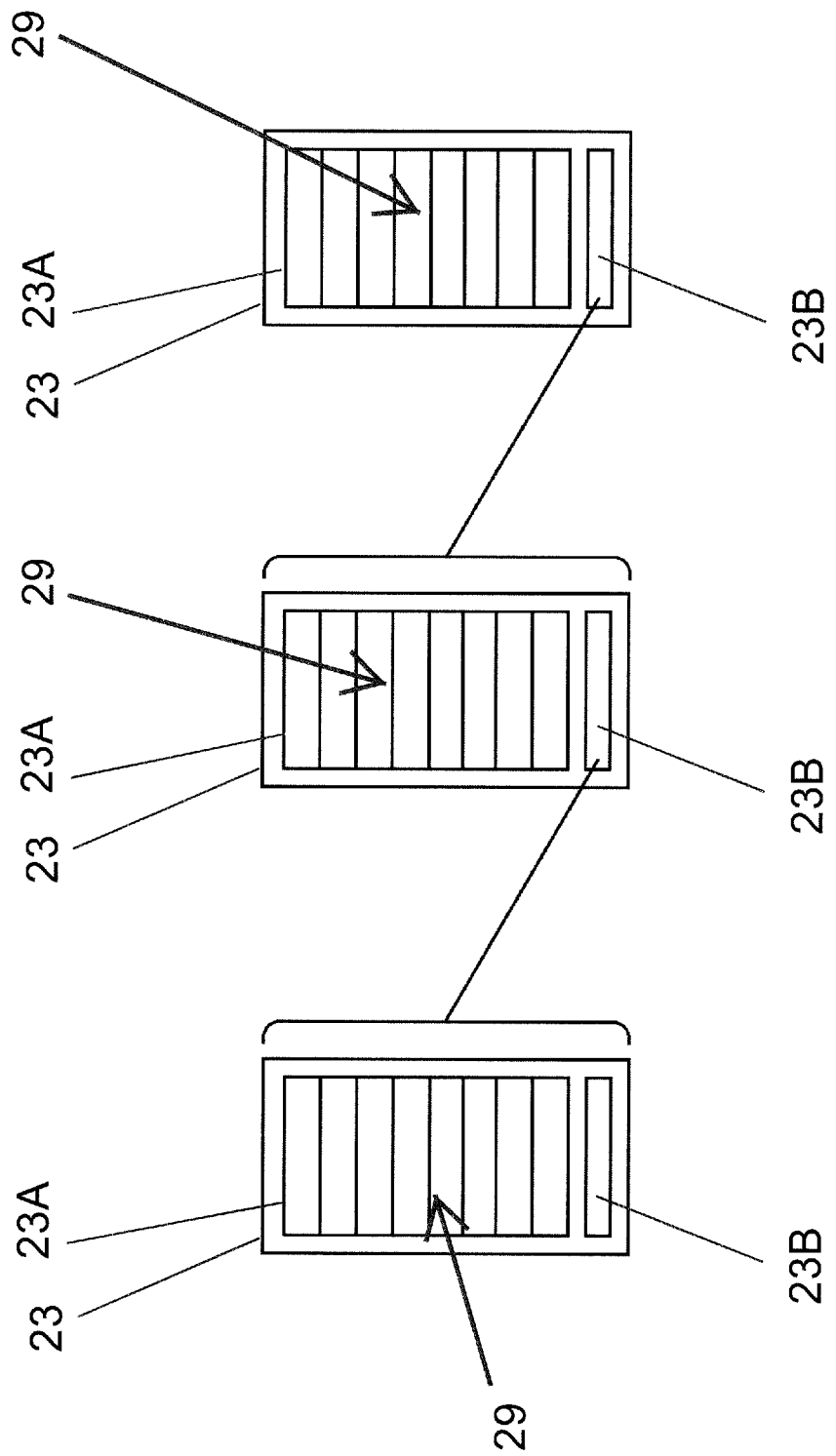
FIG. 9 shows a schematic of a copy of blockchain on a node, in accordance with a second aspect of the present invention.

FIG. 9 illustrates three blocks 23 of a blockchain in accordance with a second embodiment of the invention. Each data section 23A includes a plurality of install records 29. In FIG. 9, each block 23 is shown containing the same number of install records 29, although this should not be considered limiting. The blocks 23 of the blockchain could each contain a different number of records 29 relative to the other blocks 23 of the blockchain.

Each install record 29 includes at least a driver assistance system unique identifier (for example, a serial number of a safety ECU) and an operating instructions identifier (for example, an operating instructions version number). Each install record 29 signifies a documentation of the installation of the operating instructions corresponding to the operating instructions identifier onto the safety ECU corresponding to the safety ECU identifier. A given safety ECU, having a single ECU identifier, may have multiple install records 29 in the distributed blockchain. For example, a first install record when the original operating instructions are installed onto the safety ECU, followed by at least one update install record corresponding to an update of the operating instructions on the safety ECU to a different (e.g. later) version of the operating instructions. Some or all install records may also include further information, for example the time and date of the installation. Test results of the behaviour of the safety ECU, or the trimming of parameters in the ECU may be stored in a smart contract, which could form at least part of an install record. The install records 29 need not all have the format (i.e. the same fields). A given block may include install records corresponding to different driver assistance system unique identifiers.

A copy of the blockchain on a node can be queried only if it has not been flagged as insecure as a fault copy. In other words, use of a copy of the blockchain is only permitted if the copy of the blockchain is not a fault copy. If the copy of the blockchain has been flagged as a fault copy, then the use of the copy of the blockchain is blocked. In turn, this means that the fault copy cannot be queried and the data therein cannot be used.

If the copy of the blockchain is not a fault copy, then the copy of the blockchain may be queried in the manner of database. For example, the query may be based on a query driver assistance system unique identifier, in which case all install records corresponding to that query driver assistance system unique identifier may be returned. In this example, a verified install history for a particular driver assistance system can be found. In another example, the query may be based on a query operating instructions identifier, in which case all install records corresponding to that query operating instructions identifier may be returned. In this example, a verified list of safety ECUs having the queried version of the operating instructions installed thereon may be identified. The ego vehicles including these particular safety ECUs may then be targeted for an update to those operating instructions if one is available.

The distributed blockchain in accordance with the second embodiment implements both the blockchain security check (on intra-node basis) and the verification routine (on an inter-node basis) to secure the install records.

In this way, a secure record of the operating instructions that have been installed on a particular safety ECU is maintained. The veracity of the record is maintained by the verification routine and the blockchain security function (i.e. using the block hash values). In other words, the blockchain allows for secure traceability of the operating instructions of a driver assistance system.

When the operating instructions are updated on a particular safety ECU, for example, a new install record is produced corresponding to that update. The install record needs to be added to the blockchain. More specifically, the record is added to the data section 23A of a new block that is to be added to the blockchain. Multiple records may be collected into a single new block, which is then appended to the end of each blockchain copy. The blockchain thereby increases in length by one block 23. The new block 23 is transmitted to the nodes, and added to the end of each of the copies of the blockchain. The new block 23 may be formed at one of the nodes 22 before being transmitted to the other nodes 22. The new block 23 can be verified by any node 22 by comparing the block hash value in the blockchain metadata 23B of the putative new block to the node's own calculation of what the block hash value should be according to the data of the immediately preceding block in that node's copy of the blockchain.

In both embodiments, there are two checks that may be performed to verify the content of the blockchain: the blockchain security check of each blockchain copy and the verification routine. The combination may allow for improved operating instruction security or operating instruction install traceability. A fault copy of the blockchain may also be identified by the blockchain security check.

In both embodiments, access to the blockchain may be controlled. For example, only certain parties may be able to add new blocks and/or only (potentially different or overlapping) certain parties may be able to read the blockchain. The blockchain may be a permissioned blockchain.

In both embodiments, the blockchain may be encrypted. That is, the copy of the blockchain may be encrypted on the nodes. Furthermore, data extracted from, or sent to, the blockchain of the first embodiment for example a version of the operating instructions and corresponding verified hash value, or copy of a block may be encrypted as it is transmitted. Data extracted from, and/or sent to, the blockchain of the second embodiment may also be encrypted as it is transmitted. In both cases, and by way of examples only, the encryption may be using a Transport Layer Security (TLS) or Secure Sockets Layer (SSL) protocol. Communications between an ego vehicle and the blockchain may use one or more such encryption protocols.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of securing operating instructions for a driver assistance system of a motor vehicle, the method comprising the steps of:
    implementing a distributed blockchain including a plurality of blocks, a copy of the blockchain being stored on each of a plurality of nodes, wherein the plurality of nodes are arranged as a computer network, the driver assistance system includes a safety electronic control unit, the operating instructions dictate operation of the safety electronic control unit, and
    wherein each of the blocks include a different version of the operating instructions,
    performing a verification routine including checking that the copies of the blockchain are identical across the copies at the nodes;
        and, where a fault copy of the blockchain is not identical, flagging the fault copy as insecure;
        and preventing use of the fault copy, thus preventing installation of the operating instructions on the safety electronic control unit of the blocks of the fault copy; and
    performing an electronic control unit update routine including installing, on the driver assistance system, an install version of the operating instructions from an install block, wherein the install block is not comprised in the fault copy.

2. The method according to claim 1 further comprising, implementing a version-add routine including adding a new block to the copy of the blockchain on each of the nodes, the new block including an updated version of the operating instructions.

3. The method according to claim 1 further comprising copying the whole of the install block to the safety electronic control unit.

4. The method according to claim 1, wherein each block includes a verified hash value regarding a respective version of the operating instructions.

5. The method according to claim 4 further comprising copying a verified hash value of the install version of the operating instructions into a verified hash storage memory on the safety electronic control unit.

6. The method according to claim 5, wherein the verified hash value is calculated for input data including at least a portion of install block metadata of the install block.

7. The method according to claim 1, further comprising, wherein the blockchain is access-controlled.

8. The method according to claim 1 further comprising, wherein the blockchain is encrypted.

9. A method of tracing operating instructions for a driver assistance system for a motor vehicle, the method comprising:
    implementing a distributed blockchain including a plurality of blocks, a copy of the blockchain being stored on each of a plurality of nodes, wherein the plurality of nodes are arranged as a computer network, the driver assistance system includes a safety electronic control unit, the operating instructions dictate operation of the safety electronic control unit, and
    wherein each of the blocks includes at least one install record, wherein each install record includes at least a driver assistance system unique identifier and an operating instructions identifier,
    performing a verification routine including checking that each block of the blockchain is identical across the copies of the blockchain across the copies at the nodes;
        and, where a fault copy of the blockchain is not identical, flagging the fault copy as insecure;
        and preventing use of the fault copy, thereby preventing use of the install records comprised in the blocks of the fault copy; and
    permitting a copy of the blockchain that is not the fault copy to be queried to identify whether a more recent version of the installed operating instructions is available in the copy of the blockchain, and if a more recent version is available, installing the more recent version of the operating instructions on to the driver assistance system.

10. The method according to claim 9 further comprising, wherein the operating instructions identifier includes a version identifier of the installed operating instructions.

11. The method according to claim 9 further comprising, wherein at least one install record includes at least one of:
    an install time at which the operating instructions corresponding to the operating instructions identifier were installed onto the driver assistance system corresponding to the driver assistance system unique identifier; and
    test results of an operation of the driver assistance system corresponding to the driver assistance system unique identifier.

* * * * *